(12) United States Patent
Simonetta et al.

(10) Patent No.: US 11,808,348 B2
(45) Date of Patent: Nov. 7, 2023

(54) REVERSE GEAR SYSTEM FOR VEHICLE

(71) Applicant: Indian Motorcycle International, LLC, Medina, MN (US)

(72) Inventors: Corey A. Simonetta, Rush City, MN (US); Dustin D. Keller, Lindstrom, MN (US); Andrew J. Ellsworth, Stanchfield, MN (US)

(73) Assignee: Indian Motorcycle International, LLC, Medina, MN (US)

( * ) Notice: Subject to any disclaimer, the term of this patent is extended or adjusted under 35 U.S.C. 154(b) by 0 days.

(21) Appl. No.: 17/772,278

(22) PCT Filed: Oct. 29, 2020

(86) PCT No.: PCT/US2020/057942
§ 371 (c)(1),
(2) Date: Apr. 27, 2022

(87) PCT Pub. No.: WO2021/087101
PCT Pub. Date: May 6, 2021

(65) Prior Publication Data
US 2022/0373081 A1 Nov. 24, 2022

Related U.S. Application Data

(60) Provisional application No. 62/927,356, filed on Oct. 29, 2019.

(51) Int. Cl.
*F16H 61/28* (2006.01)
*F16H 3/46* (2006.01)
(Continued)

(52) U.S. Cl.
CPC .......... *F16H 61/2807* (2013.01); *F16H 3/46* (2013.01); *F16H 59/12* (2013.01); *F16H 59/44* (2013.01);
(Continued)

(58) Field of Classification Search
CPC ........ F16H 1/2827; F16H 1/2836; F16H 3/46; F16H 59/12; F16H 59/44; F16H 59/70;
(Continued)

(56) References Cited

U.S. PATENT DOCUMENTS 4,763,538 A * 8/1988 Fujita ..................... B62K 23/06
477/181
7,311,636 B1 12/2007 Regula
(Continued)

FOREIGN PATENT DOCUMENTS

CN 2563095 Y 7/2003
CN 201908998 U 7/2011
(Continued)

OTHER PUBLICATIONS

International Search Report and Written Opinion regarding International Application No. PCT/US2020/057942, dated Jan. 29, 2021.
(Continued)

*Primary Examiner* — Edwin A Young
(74) *Attorney, Agent, or Firm* — Harness, Dickey & Pierce, P.L.C.

(57) ABSTRACT

A system and method for operating the same includes a drive sprocket assembly, a clutch lever, a user interface generating a reverse signal at a user interface, a wheel speed sensor generating a wheel speed signal, a transmission position sensor generating a transmission position signal and a vehicle control module receiving the reverse signal, the wheel speed signal and the transmission position signal. The vehicle control module engages a reverse gear at a drive sprocket in response to the reverse signal, the wheel speed and transmission gear position and controls the drive sprocket assembly in response to the clutch lever.

20 Claims, 15 Drawing Sheets

(51) Int. Cl.
  *F16H 59/12*  (2006.01)
  *F16H 59/44*  (2006.01)
  *F16H 59/70*  (2006.01)
  *F16H 61/04*  (2006.01)
  *F16H 61/686* (2006.01)
  *F16H 63/50*  (2006.01)
(52) U.S. Cl.
  CPC ............. *F16H 59/70* (2013.01); *F16H 61/04* (2013.01); *F16H 61/686* (2013.01); *F16H 63/50* (2013.01)
(58) Field of Classification Search
  CPC .... F16H 61/04; F16H 61/2807; F16H 61/686; F16H 63/50
  See application file for complete search history.

(56) References Cited

U.S. PATENT DOCUMENTS

| | | | |
|---|---|---|---|
| 7,448,979 | B2 | 11/2008 | Chen |
| 7,690,668 | B2 | 4/2010 | Holroyd |
| 7,794,355 | B2 | 9/2010 | Pusateri |
| 7,815,542 | B2 | 10/2010 | Dec |
| 8,777,795 | B2 | 7/2014 | Schwarz et al. |
| 9,739,365 | B2 | 8/2017 | Yelvington |
| 10,197,135 | B2 | 2/2019 | Yelvington |
| 2008/0196960 | A1 | 8/2008 | Brown et al. |
| 2011/0015030 | A1* | 1/2011 | Xue ...................... B62M 11/04 476/14 |
| 2013/0340551 | A1 | 12/2013 | Grandi |
| 2015/0274257 | A1 | 10/2015 | Sakamoto et al. |
| 2015/0306976 | A1* | 10/2015 | Park ....................... B62M 23/02 318/3 |
| 2017/0198674 | A1* | 7/2017 | Nishida .................... F16H 1/20 |

FOREIGN PATENT DOCUMENTS

| | | |
|---|---|---|
| EP | 2762756 A2 | 8/2014 |
| GB | 2403782 A | 1/2005 |
| JP | S62178440 A | 8/1987 |
| JP | 2009-243561 A | 10/2009 |
| JP | 2014-149021 A | 8/2014 |
| JP | 2015-194213 A | 11/2015 |
| JP | 2016-114230 A | 6/2016 |

OTHER PUBLICATIONS

Japanese Office Action dated Aug. 21, 2023 in corresponding Japanese Application No. 2022-525293.

* cited by examiner

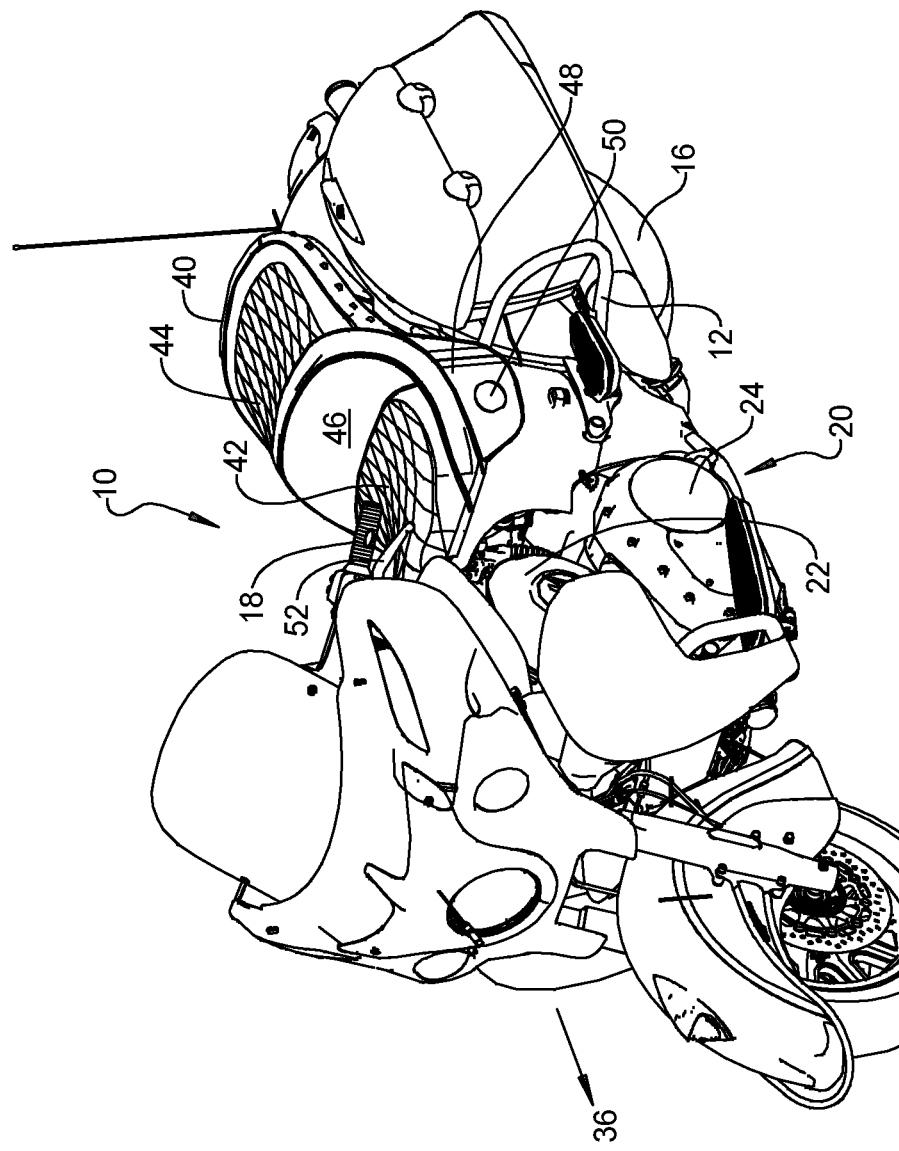

REVERSE GEAR SYSTEM FOR VEHICLE

CROSS REFERENCE TO RELATED APPLICATIONS

This application is a U.S. National Phase Application under 35 U.S.C. 371 of International Application No. PCT/US2020/057942, filed on Oct. 29, 2020, which claims the benefit of U.S. Provisional Application No. 62/927,356, filed on Oct. 29, 2019. The entire disclosure of the above application is incorporated herein by reference.

FIELD

The present disclosure relates to vehicle direction control and, more particularly, to controlling the reverse direction of a motorcycle.

BACKGROUND

This section provides background information related to the present disclosure which is not necessarily prior art.

A motorcycle includes an engine assembly. The engine assembly is operated with the use of fuel to generate power to drive the motorcycle in the forward direction. Unlike cars, motorcycles typically do not have reverse gears.

Motorcycle designs have increasingly become more complex and heavy. Providing a way to provide a reverse direction operation would increase the maneuverability of the motorcycle.

SUMMARY

This section provides a general summary of the disclosures, and is not a comprehensive disclosure of its full scope or all of its features.

In one aspect of the disclosure, a method of activating reverse for a vehicle comprises generating a reverse signal at a user interface, communicating the reverse signal to a control module, determining a vehicle speed, determining a transmission gear position, in response to vehicle speed and transmission gear position, engaging a reverse gear at a drive sprocket assembly and controlling the drive sprocket assembly in response to a clutch lever.

In another aspect of the disclosure, a system comprises a drive sprocket assembly, a clutch lever, a user interface generating a reverse signal at a user interface, a wheel speed sensor generating a wheel speed signal, a transmission position sensor generating a transmission position signal and a vehicle control module receiving the reverse signal, the wheel speed signal and the transmission position signal. The vehicle control module engages a reverse gear at a drive sprocket in response to the reverse signal, the wheel speed and transmission gear position and controls the drive sprocket assembly in response to the clutch lever.

In yet another aspect of the disclosure, a drive sprocket assembly comprises a fixed gear fixed to a transmission output shaft. The fixed gear has a first outer diameter and a first inner diameter receiving the transmission output shaft. A ring gear has a second inner diameter and a second outer diameter. The system further includes an intermediate gear and a plurality of planetary gears. In a first direction of operation, the intermediate gear engages the first outer diameter and the second inner diameter. In a second direction of operation, the plurality planetary gears displaces the intermediate gear in an axial direction to be disengaged from the first outer diameter and the second inner diameter and engage the planetary gears with the first outer diameter and the second inner diameter.

Further areas of applicability will become apparent from the description provided herein. The description and specific examples in this summary are intended for purposes of illustration only and are not intended to limit the scope of the present disclosure.

DRAWINGS

FIG. 1A is a perspective view of a motorcycle illustrating the front and left side of the vehicle.

DETAILED DESCRIPTION

Examples will now be described more fully with reference to the accompanying drawings. Although the following description includes several examples of a motorcycle application, it is understood that the features herein may be applied to any appropriate vehicle, all-terrain vehicles, utility vehicles, moped, scooters, etc. The examples disclosed below are not intended to be exhaustive or to limit the disclosure to the precise forms disclosed in the following detailed description. Rather, the examples are chosen and described so that others skilled in the art may utilize their teachings.

Figure 1B:
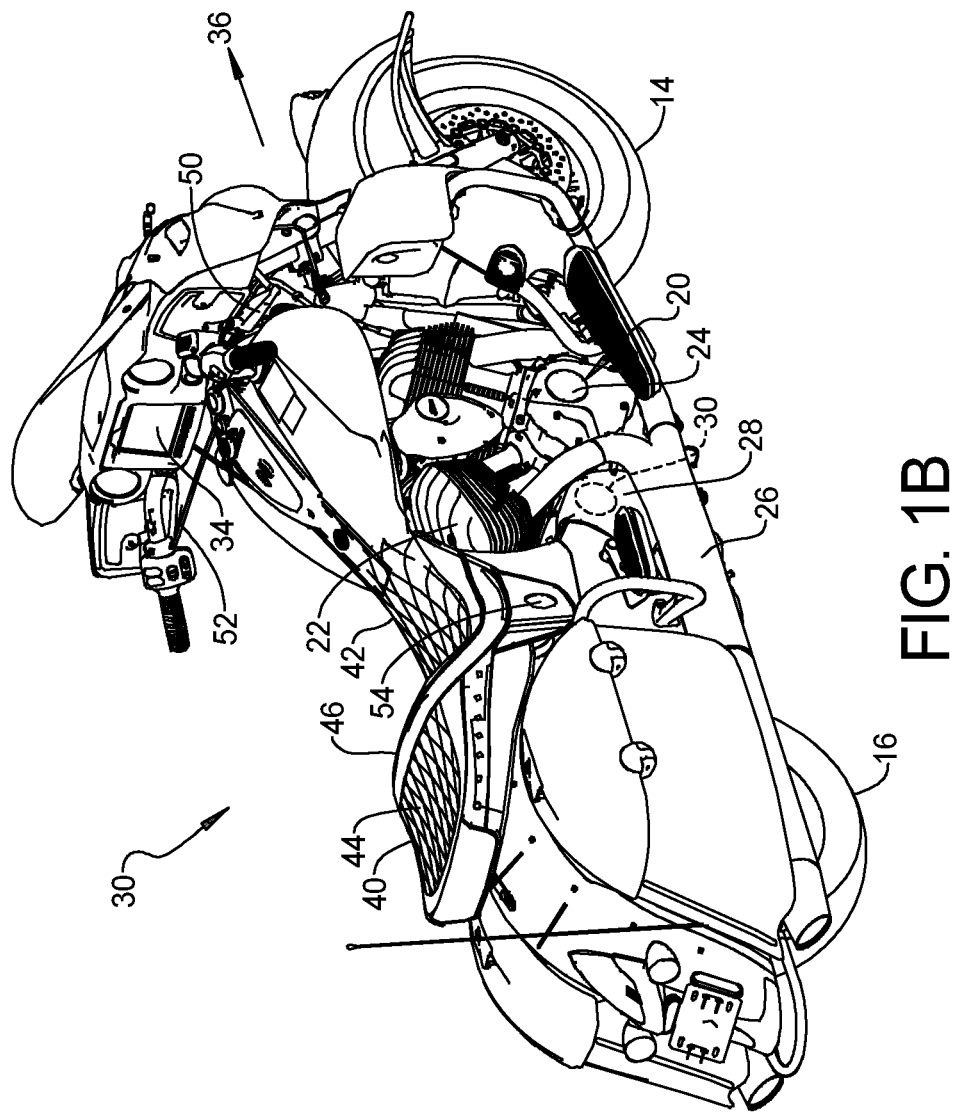
FIG. 1B is a perspective view of the motorcycle illustrating the rear and right side of the vehicle.

Referring now to FIGS. 1A and 1B, a vehicle 10 is illustrated. The vehicle 10 in this example is a two-wheeled vehicle. The two-wheeled vehicle 10 illustrated is a touring style motorcycle.

The vehicle 10 includes a frame 12 that is used to support the vehicle components including a front wheel 14 and a rear wheel 16. Wheel 14 is coupled to the handlebars 18 by way of a first fork for steering. The rear wheel 16 is a coupled to a powertrain assembly 20 that is used to provide the rotational force to the rear wheel 16, in this example. Of course, all of the wheels on a vehicle or a selected few of the wheels may be coupled to the powertrain assembly 20.

The powertrain assembly 20 includes an engine 22 and transmission 24. The powertrain assembly 20 may also include an exhaust pipe 26 that removes waste exhaust from the engine 22.

A drive sprocket assembly 28 is used to connect the output of the transmission 24 to the rear wheel 16. On some vehicles, the drive sprocket assembly 28 may be hidden by a sprocket cover 30. Details of the drive sprocket assembly 28 will be provided in further detail below.

A display panel 34 may be used to provide various information to the driver of the vehicle. The display panel 34 may include a touch screen that provides a user interface for various functions. The display panel 34 in relation to reverse operation of the vehicle is described in further detail below.

The vehicle 10 also has a longitudinal axis 36 that extends in the direction of forward travel of the vehicle 10 that extends from the front wheel 14 to the rear wheel 16.

The frame 12 may also be used to support a seat assembly 40. The seat assembly 40 can include a driver seating position 42 and a passenger seating position 44. In this example, the driver seating position 42 and the passenger seating position 44 are part of a unitary construction of the seat assembly 40 in which the passenger seating position 44 is higher (relative to the road during driving) than the driver seating position. In other types of vehicles, the driver position 42 and the passenger position 44 may be separated into two separate seats. Alternately, there may be only a single driver seat.

As is best illustrated in FIG. 1B, the vehicle 10 includes a clutch lever 50 and a throttle lever 52. The clutch lever 50 is used to engage and disengage a clutch (68 below), which in turn disengages and engages the engine 22 from the transmission 24.

Figure 2:
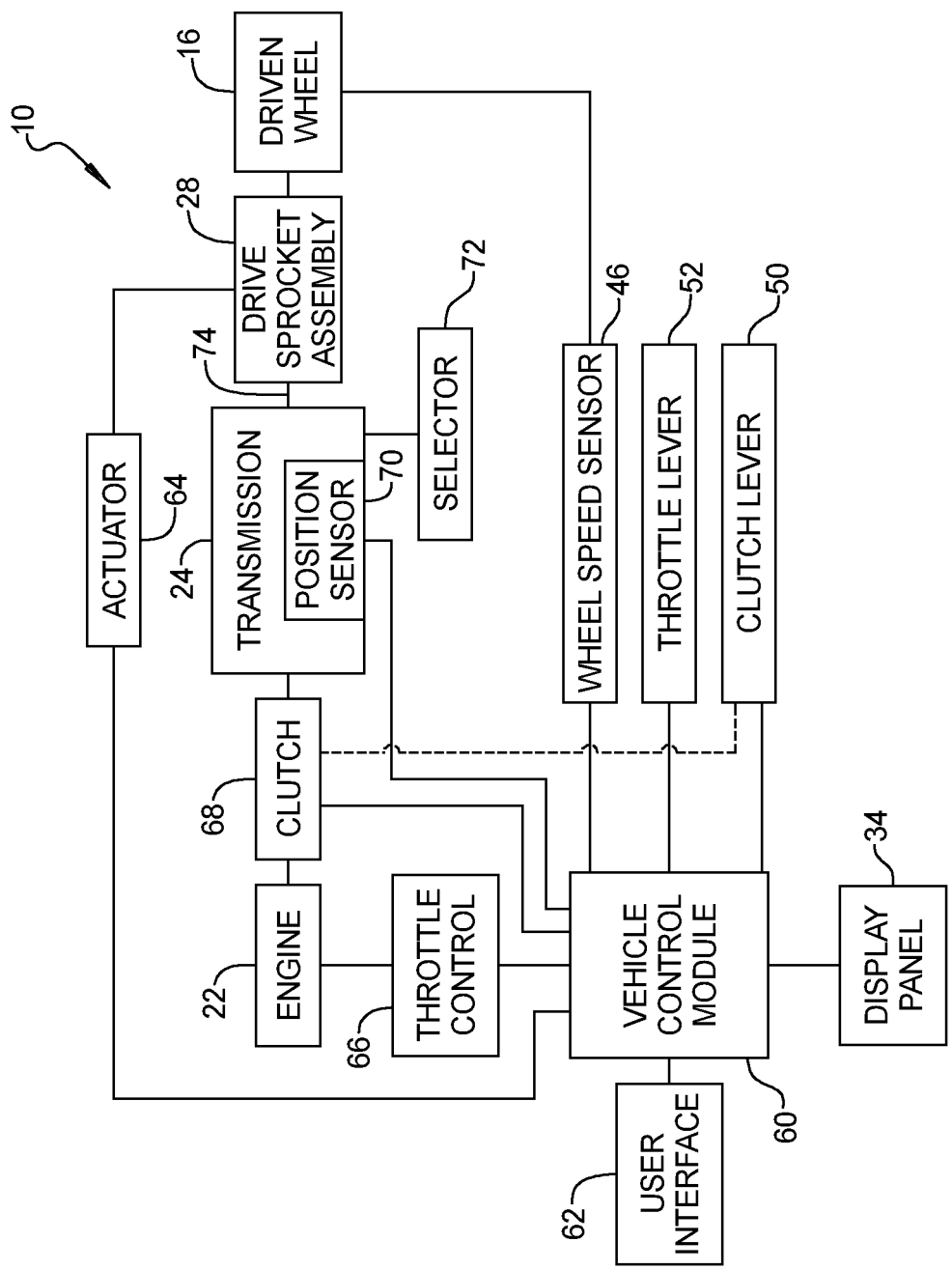
FIG. 2 is a block diagrammatical view of the reverse engaging system.

Referring now to FIG. 2, a block diagrammatical view of the system is set forth. In this example, a vehicle control module 60 is set forth. The vehicle control module 60 may be a circuit or a plurality of circuits for controlling various functions of the vehicle. The vehicle control module 60 may be a micro-processor that is programmed to perform various steps including controlling the drive direction such as the reverse direction of the vehicle 10. The vehicle control module 60 may be formed of a plurality of modules or processors that are programmed to perform various functions. The vehicle control module 60 is coupled to the user interface 62. The user interface 62 may be a one button, a plurality of buttons or virtual buttons on a touchscreen. Of course, various combinations of virtual buttons and discreet buttons may be used. When the buttons of the user interface 62 are virtual buttons, a user interface 62 and the display panel 34 may be combined. Examples of displays displayed on the display panel 34 are provided below.

The vehicle control module 60 is in communication and controls the operation of the engine 22, the transmission 24, and the drive sprocket assembly 28. As will be described in more detail below, the vehicle control module 60 controls an actuator 64 which in turn controls the drive sprocket assembly 28. As will be described in more detail below, the actuator 64 is used to control the movement of one or more gears within the drive sprocket assembly 28 to change the vehicle operating mode from operating in a forward direction to operating in a reverse direction and vice versa.

The vehicle control module 60 may also be in communication with a throttle control module 66. The throttle control module 66 may be referred to as an electronic throttle control module. The throttle control module 66 may be a standalone module or a module that is incorporated into the vehicle control module 60. The throttle control module 66 controls the engine speed based upon the input from the throttle lever 52. The throttle lever 52 may be a mechanical device or an electronic device. The throttle lever 52 may best generate a throttle signal that corresponds to the amount of engine speed desired by the vehicle operator.

A wheel speed sensor 46 is coupled to the vehicle control module 60. The wheel speed sensor 46 senses the speed at the driven wheel 16. The wheel speed sensor 46 may be one of many different types of wheel speed sensors including a toothed wheel placed on the driven wheel and a Hall effect sensor providing a speed base signal to the vehicle control module 60.

The engine 22 and the transmission 24 are coupled together with a clutch 68. The clutch 68 may be a mechanical, electromechanical or electronic actuator. The clutch 68 may be controlled by the vehicle control module in response to a clutch lever 50 when the clutch is an electronic clutch. When the clutch 50 is a mechanical clutch, the clutch lever 50 and the clutch 68 may be directly coupled together as indicated by the dotted line.

The transmission 24 comprises a position sensor 70 that is used to generate a transmission position signal. The transmission position signal corresponds to the position of the transmission. The transmission 24 includes a plurality of gears. In this example, the vehicle 10 includes a first gear and a plurality of other gears. The gears are chosen by a selector 72. The selector 72 may be a foot actuated lever, a finger actuated lever or knob. The selector 72 may also be a push button selector that is operated through the user interface 62. Of course, a combination of manual and virtual selectors may be implemented in a vehicle.

The transmission 24 has a transmission output shaft 74 that is coupled to the drive sprocket assembly 28. The transmission output shaft 74 rotates in the same direction. The drive sprocket assembly 28, as will be described in more detail below, is used to change the forward and reverse direction of the vehicle.

Figure 3A:
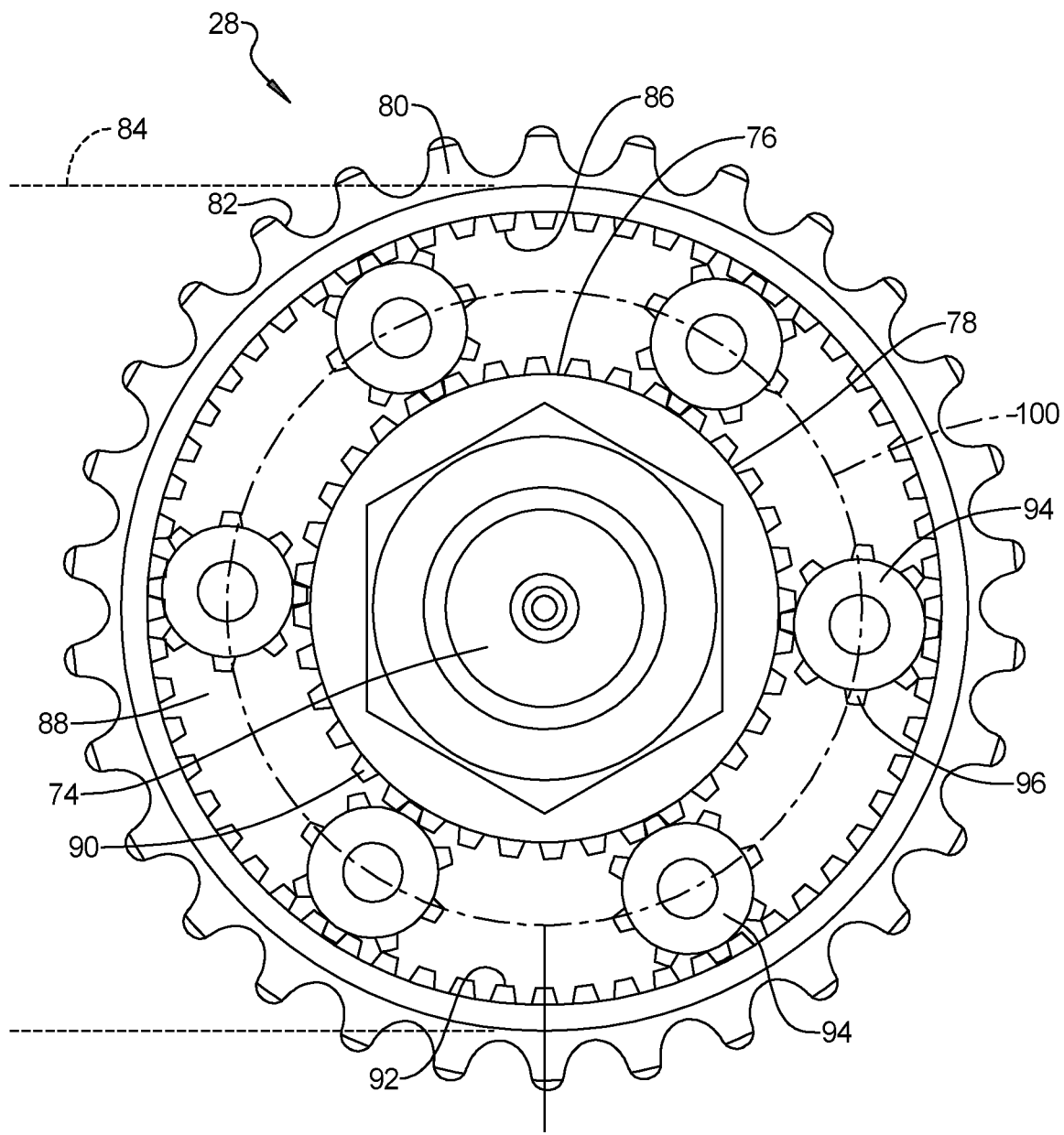
FIG. 3A is a plan view of the gear set of a first example of the drive sprocket assembly.
Figure 3B:
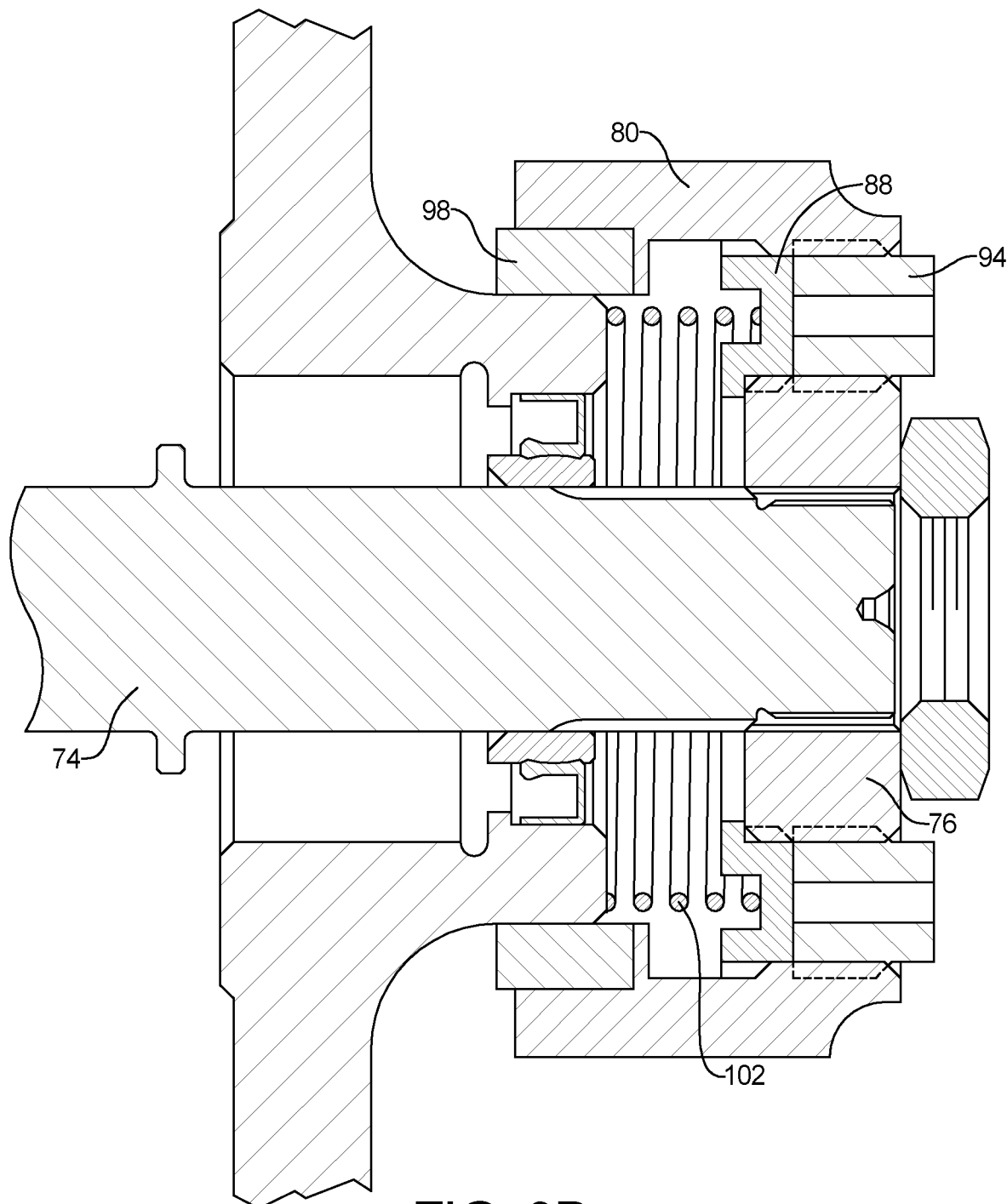
FIG. 3B is a perspective view of the drive sprocket assembly in a forward or normal operation.
Figure 3C:
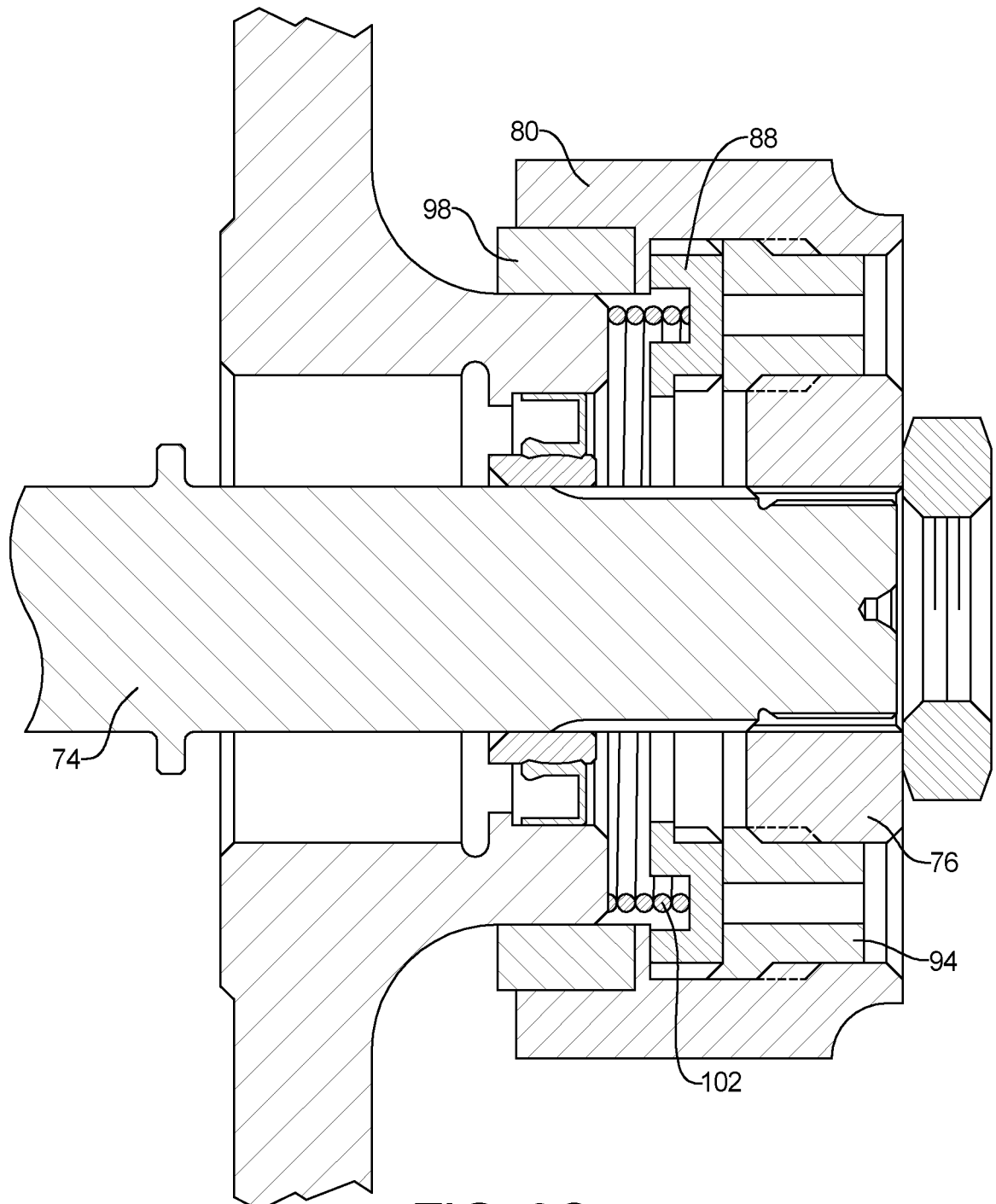
FIG. 3C is a perspective view of the drive sprocket assembly in a reverse mode of operation.
Figure 3D:
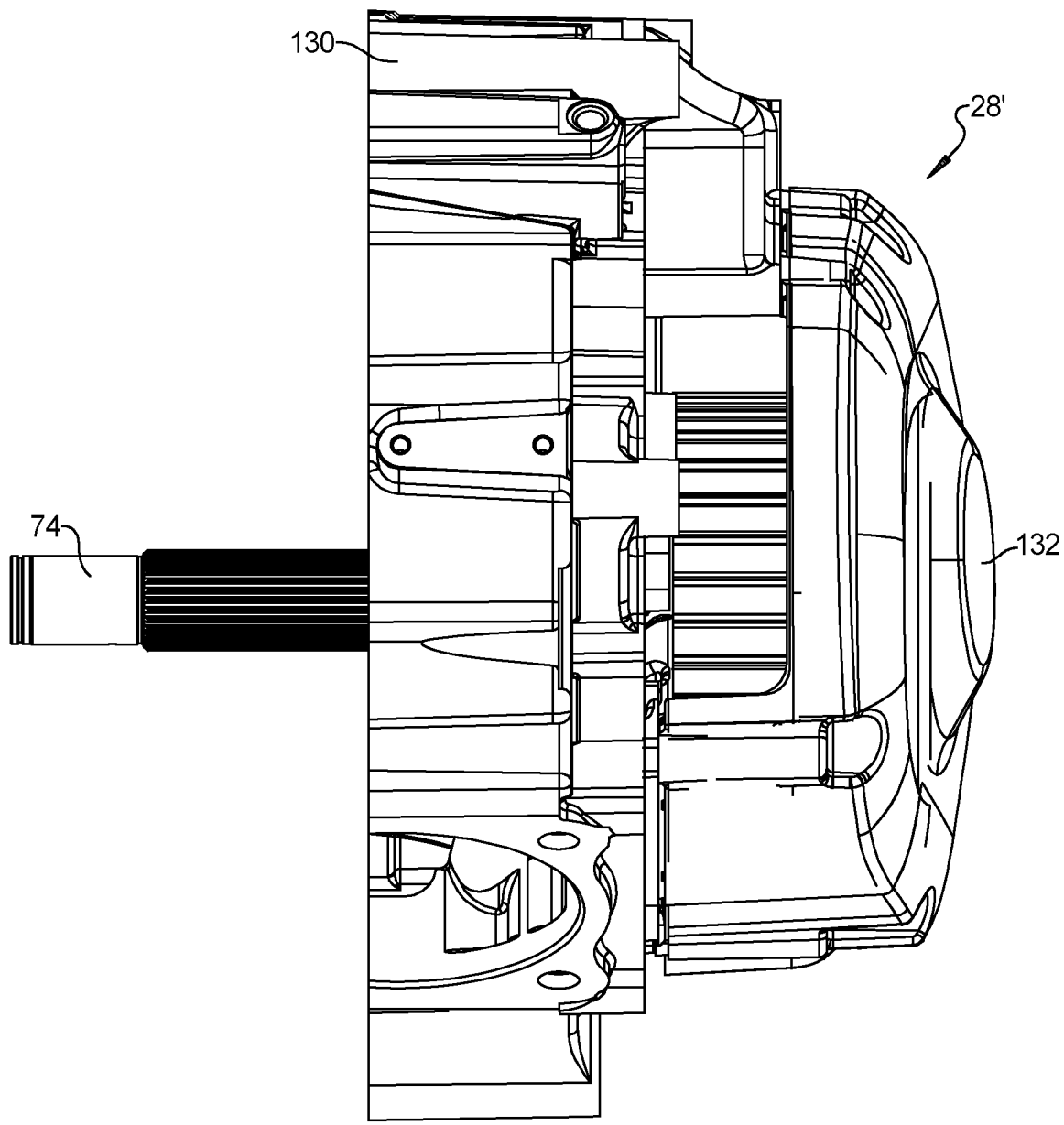
FIG. 3D is a side view of a second example of a drive sprocket assembly.
Figure 3E:
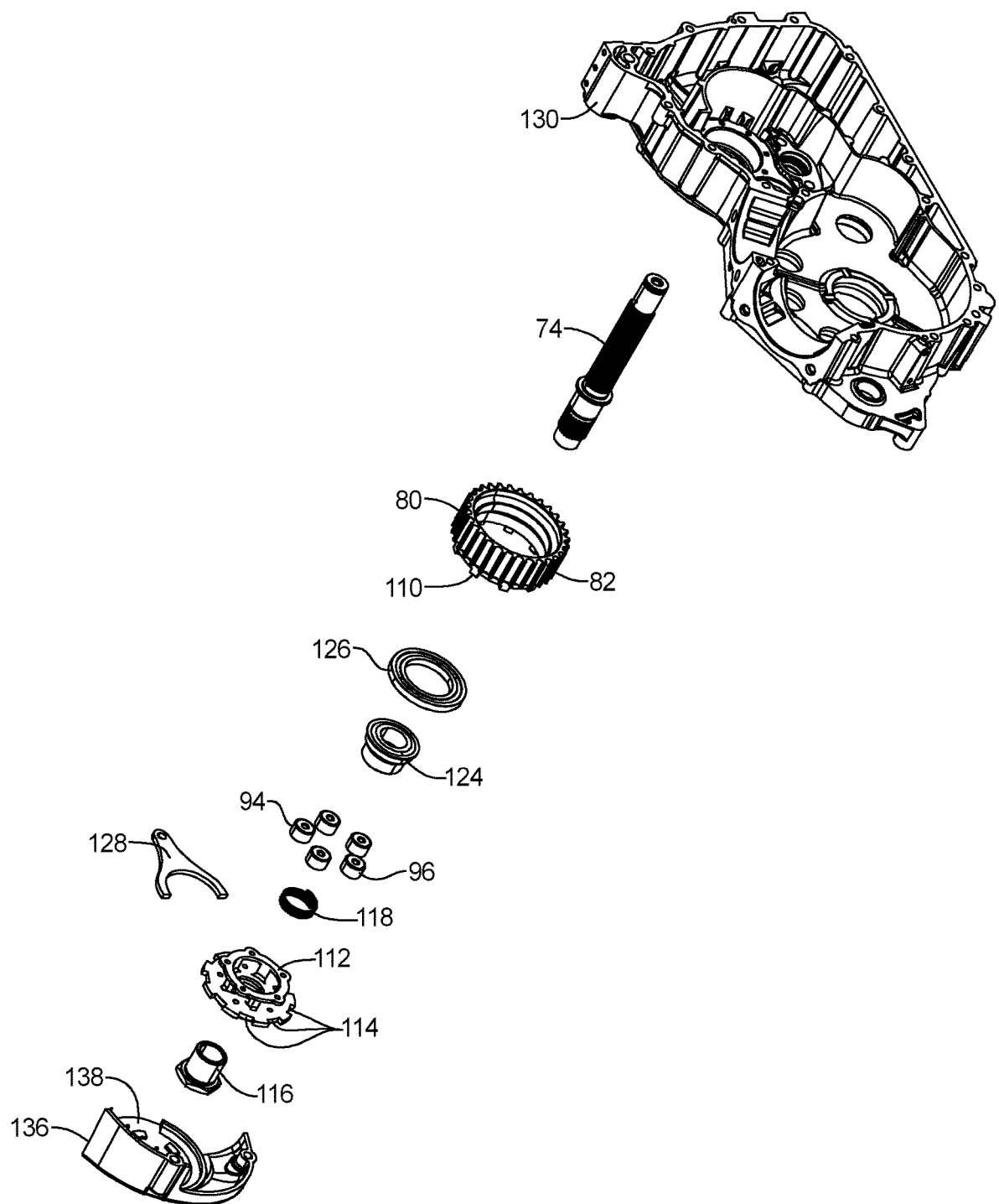
FIG. 3E is an exploded view of the second example of the drive sprocket assembly.

Referring now to the FIGS. 3A-3C, the drive sprocket assembly 28 is illustrated in further detail. The drive sprocket assembly 28 receives the transmission output shaft 74 of the transmission 24. The transmission output shaft 74 is received in an inner diameter of a fixed gear 76. A gear 76 rotates with the transmission output shaft 74 and has a plurality of teeth 78 disposed on the outer periphery thereof. The fixed gear 76 is concentric with the transmission output shaft 74. The fixed gear 76 has an outer diameter that is concentric with the transmission output shaft 74.

The drive sprocket assembly 28 also includes a ring gear 80 that has an outer diameter that has teeth 82 disposed thereon. The teeth 82 are sized to receive a chain 84 used to drive the rear wheels 16. The ring gear 80 also has an inner diameter that has teeth 86 therein. In this example, the pitch of the teeth is much greater than the pitch of the teeth 82 on the outer diameter of the ring gear 80.

Between the fixed gear 76 and the inner diameter of the ring gear 80, two different options are present depending on the desired mode of the vehicle. An intermediate gear has an inner diameter that corresponds to the outer diameter of the fixed gear 76 and an outer diameter that corresponds to the inner diameter of the ring gear 80, in the same direction. When the intermediate gear 88 is engaged between the fixed gear 76 and the ring gear 80, the fixed gear rotates with a 1:1 ratio with the ring gear 80. In should be noted that the teeth 78 of the fixed gear 76 correspond to the grooves 90 on the inner diameter of the intermediate gear 88. Grooves 92 on the outer diameter of the intermediate gear 88 correspond directly to the pitch of the teeth 86.

The intermediate gear 88 engages in the forward or normal direction. When the reverse direction is desired, a plurality of planetary gears 94 engage between the outer diameter of the fixed gear 76 and the inner diameter of the ring gear 80 and the intermediate gear 88 is disengaged. In this example, six planetary gears 94 are illustrated. The teeth 96 engage between the teeth 86 on the inner diameter of the ring gear 80 and the outer diameter of the fixed gear 76. It should be noted that if the intermediate gear 88 and the planetary gears 94 were disengaged the ring gear 80 would rotate freely on the bearing 98. A centerline 100 of the planetary gears 94 are coaxial with the transmission output shaft 74, the fixed gear 76, the intermediate gear 88 and the ring gear 80. A spring 102 provides a resistive force to the intermediate gear 88 in the axial direction.

As is best shown in FIG. 3B, the planetary gears 94 are not illustrated for simplicity because they are not engaged. In the example illustrated in FIG. 3B, the intermediate gear 88 engages both the fixed gear 76 and the ring gear 80 so that the ring gear 80 moves together with the transmission output shaft 74 and fixed gear 76.

When the reverse direction is desired, the planetary gears 94 move axially relative to the transmission output shaft 74 and displace the engagement of the intermediate gear so the intermediate gear no longer couples the fixed gear 76 to the inner diameter of the ring gear 80. In FIG. 3C, the planetary gears 94 cause the ring gear 80 to move in the opposite rotational direction as the transmission output shaft 74 and the fixed gear 76. Thus, the transmission output shaft 74 continues to rotate in the same direction as in the normal or format drive operation but the planetary gears cause the ring gear 80 to rotate in the opposite direction. When the ring gear 80 moves in the opposite direction, the chain 84 also moves in the opposite direction causing the rear wheels 16 to move in the reverse or opposite direction. Although not illustrated, the intermediate gear 88 is grounded to the frame of the motorcycle transmission case so it does not rotate in this state.

Referring now to FIGS. 3D through 3I, a second example of a reverse drive sprocket assembly 28' is set forth. In this example, the intermediate gear is a ring gear 80 is illustrated. The ring gear 80 has teeth 110 extending therefrom. The teeth 110 extend in an axial direction toward the end of the shaft 74 opposite the transmission of the vehicle. As illustrated, the number of teeth is nine. However, other numbers of teeth may be provided. Ultimately the teeth 110 are used to engaged and disengage a planet carrier 112. In particular, nine recesses 114 are illustrated around the periphery of the planet carrier 112. The planet carrier 112 is used to carry the planet gears 94. The planet carrier 112 is secured to the shaft 74 by a nut countershaft 116. A spring 118 is disposed around the outer periphery of the nut countershaft 116 to provide a resistive force. A sun gear 124 is also associated with the planet carrier 112. A bearing 126 disposed between the sun gear 24 and the fixed gear 76.

A reverse fork 128 is used to move the planet carrier 112 in an axial direction under the control of the clutch lever. The system may also include a mounting cover 130 used to mount the system to the motorcycle or vehicle. A cover 136 has a slot 138 for receiving the reverse fork 128. Thus, the reverse fork 128 after assembly is disposed between the inner cover 136 and the planet carrier 112. The cover 136 corresponds generally to the sprocket cover 30 illustrated above. It should also be noted that the ring gear 80 has teeth 82 disposed around the outer surface thereof. The teeth 82 may be used for engaging a chain, a drive belt or other flexible drive member for driving the rear wheel of the vehicle.

Figure 3F:
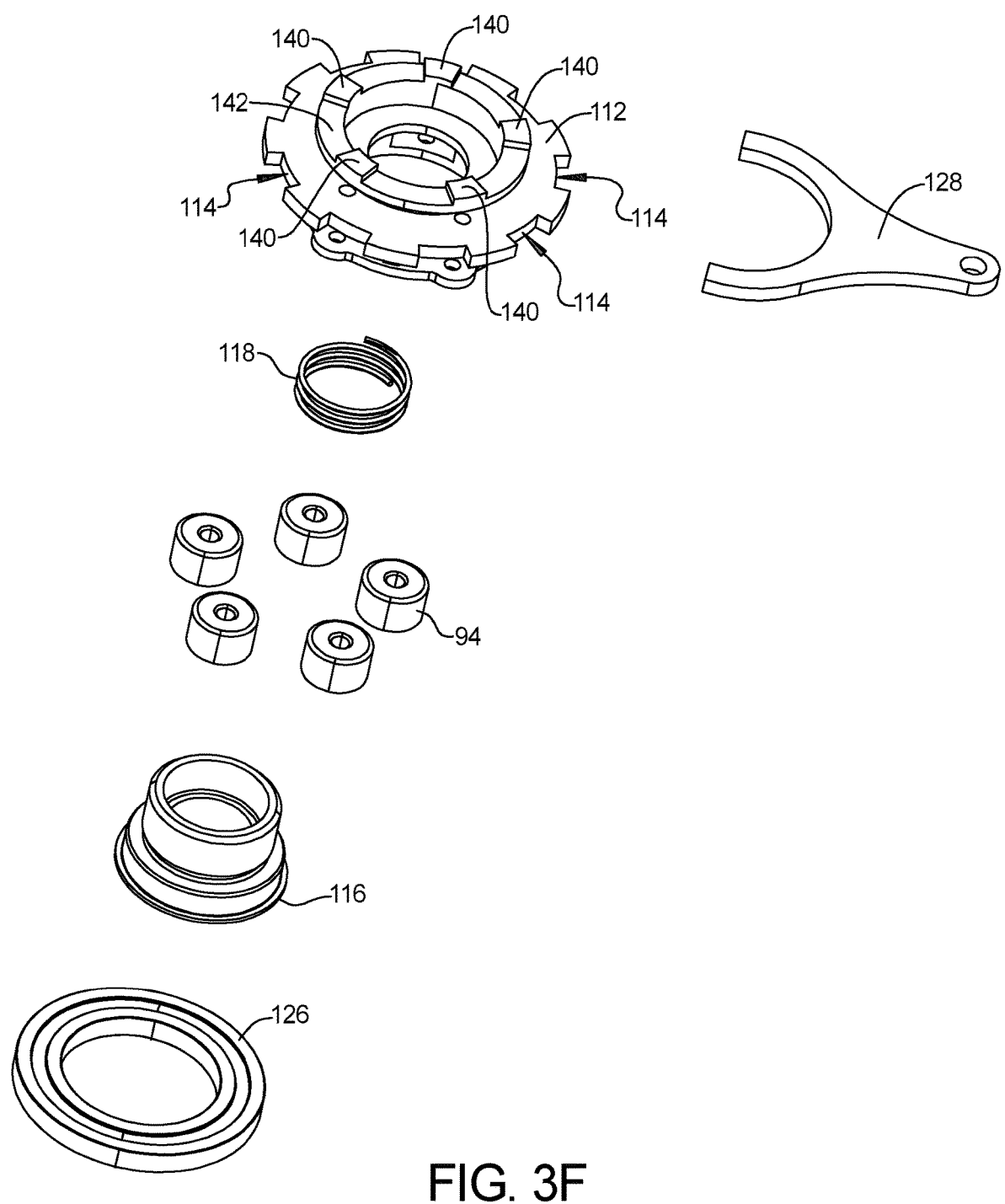
FIG. 3F is a partial exploded view of the planet carrier and planet gears of the second example of the drive sprocket assembly.
Figure 3G:
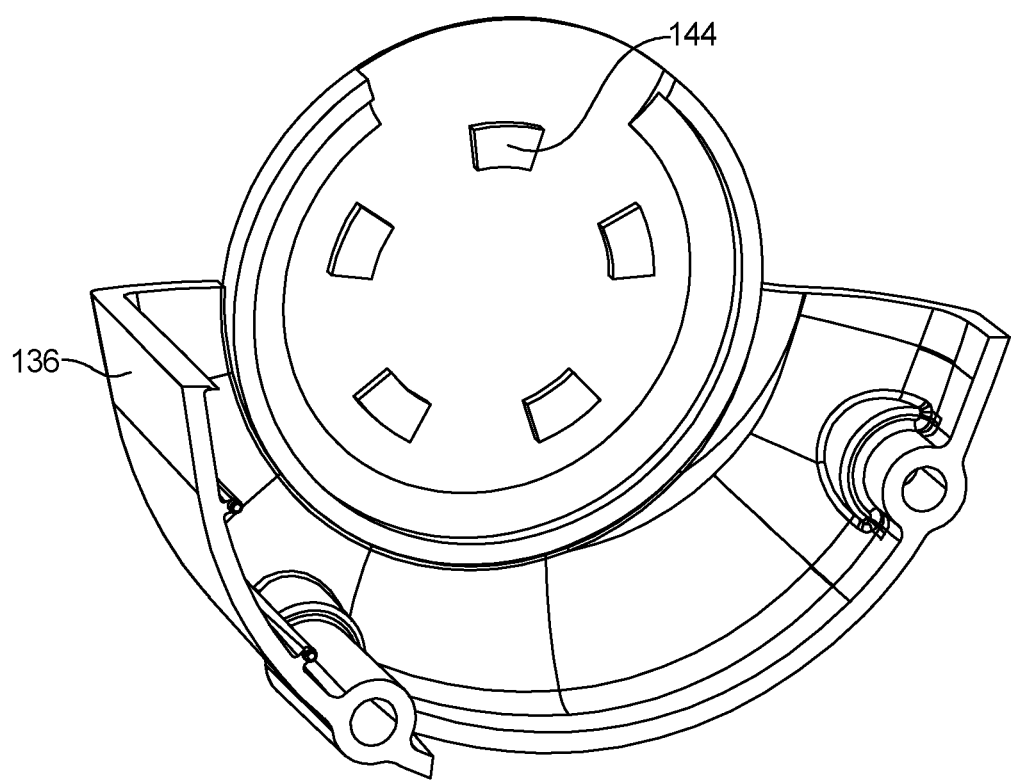
FIG. 3G is a perspective of the inside of the inner cover of the second example.

As is best shown in FIG. 3F, the planet carrier 112 has both recesses 114 and axial teeth 140. In this example, five axial teeth 140 extend from a radially-extending surface 142. The axial teeth 140 are used to engage recesses 144 in the cover 136 during reverse operation.

Figure 3H:
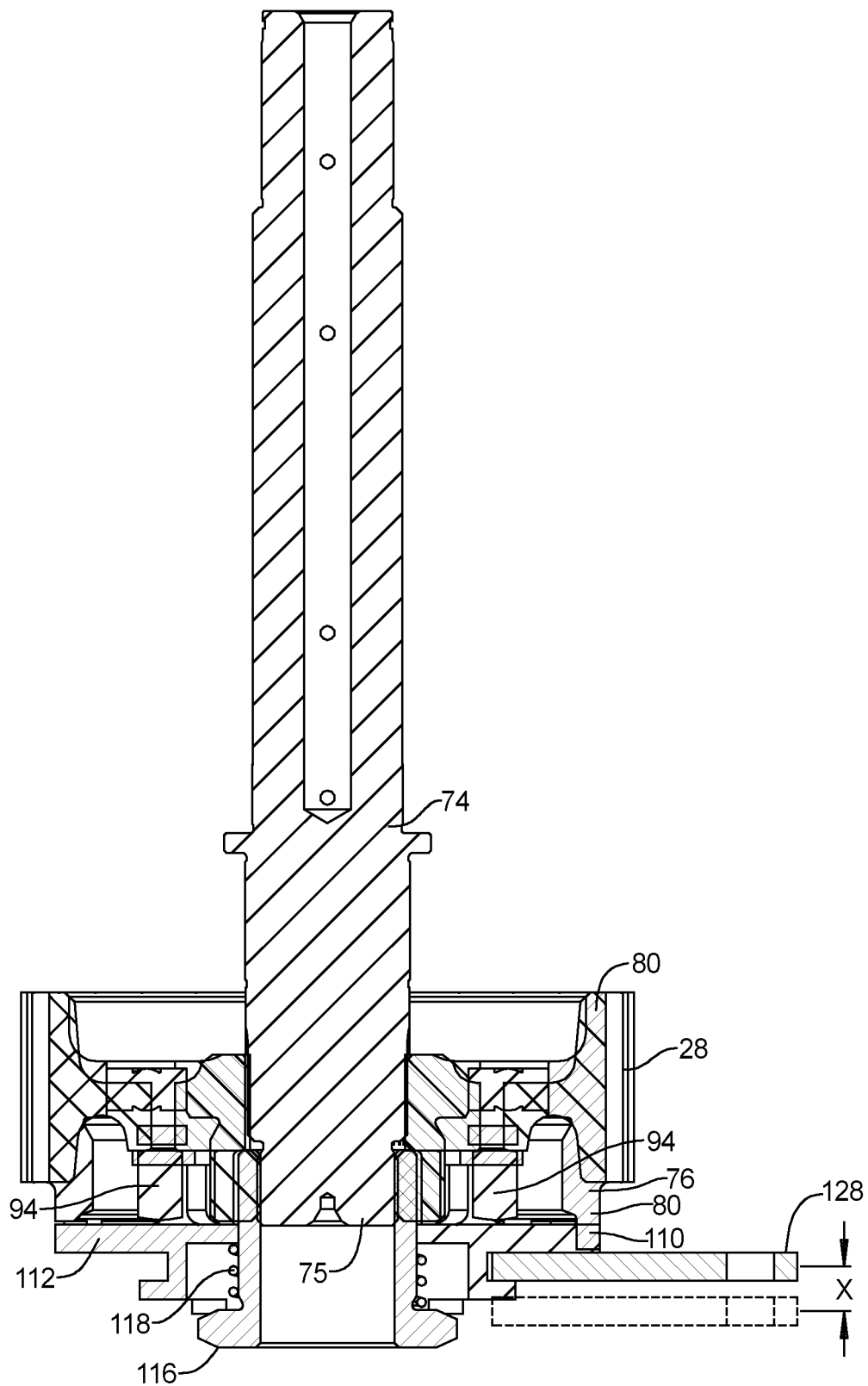
FIG. 3H is a cross-sectional view of the second example of the drive sprocket assembly in a forward or normal operation.

In operation, the forward direction is best illustrated in FIG. 3H. In FIG. 3H, the planet carrier 112 is moved away from the end 75 of the shaft 74. That is, the end 75 of the shaft 74 is disposed away from the drive source such as the transmission 24. The reverse fork 128 moves the planet carrier 112 in a direction axially inward so that the recesses 114 of the planet carrier 112 engage the teeth 110. In this manner, the axial teeth 140 do not engage the recesses 144 of the inner cover and thus the planet carrier rotates in the same direction as the shaft which ultimately causes the ring gear 80 to move in the same direction as the shaft 74.

Figure 3I:
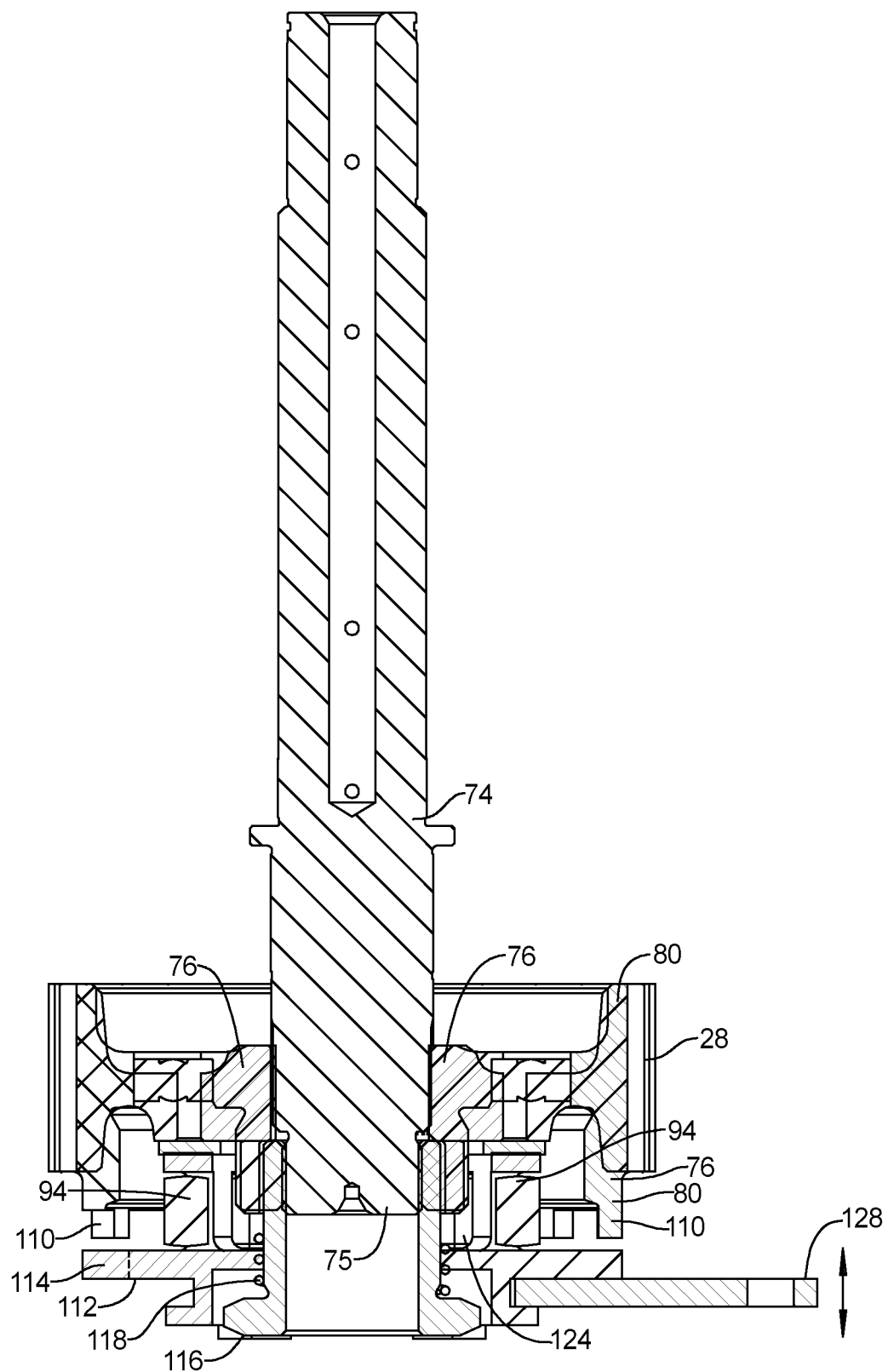
FIG. 3I is a cross-sectional view of the second example of the drive sprocket assembly in a reverse mode of operation.

Referring now to FIG. 3I, the teeth 110 of the intermediate gear are disengaged from the recesses 114 of the planet carrier 112. In this manner, the planetary gears 94 engage the sun gear 124 and rotate the ring gear 80 in the opposite or reverse direction as the turning shaft 74.

Figure 4:
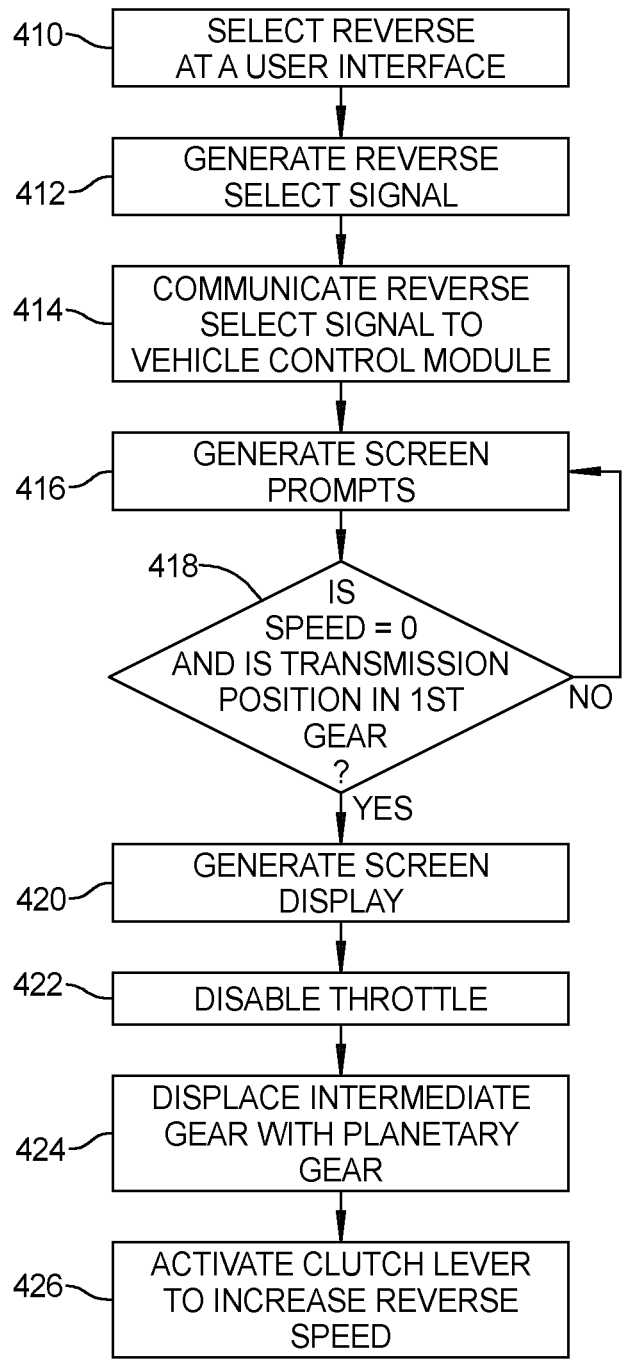
FIG. 4 is a flowchart of a method for engaging reverse.
Figure 5A:
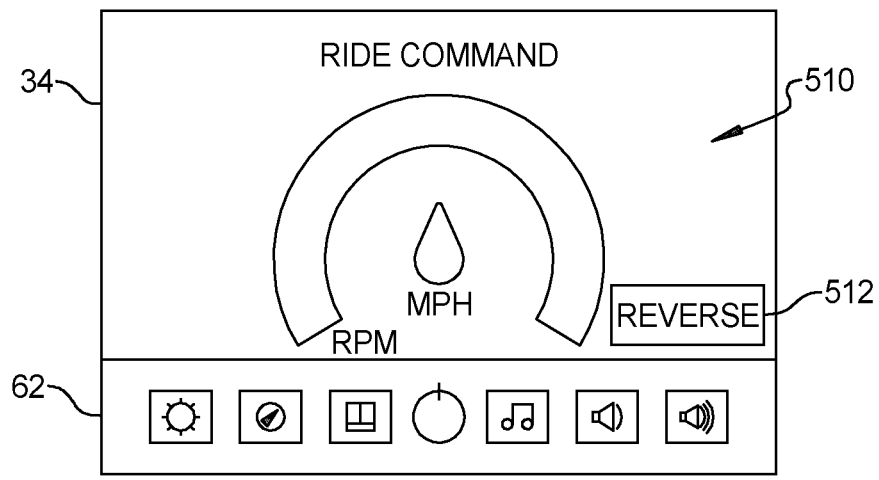
FIG. 5A is a first screen display illustrating a reverse engagement user interface.
Figure 5B:
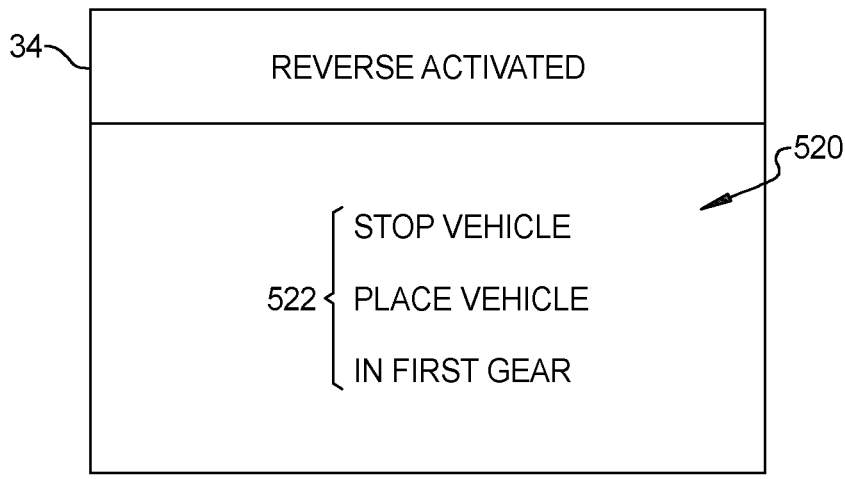
FIG. 5B is a screen display providing instructions to the vehicle operator for engaging the reverse mode.

Referring now to FIG. 4, a method for operating the vehicle in a reverse direction is set forth. In step 410, a reverse mode is selected at a user interface. Referring now also to FIG. 5A, a screen display 510 displayed on the display panel 34 is set forth. In this example, a virtual button 512 is displayed on a touchscreen. However, a reverse button may be provided in the user interface 62 as a discreet button as described above. After the reverse button is selected at the user interface, a reverse select signal is generated in step 412. The reverse select signal is communicated to the vehicle control module 60. The vehicle control module 60 prompts a second screen display as illustrated in FIG. 5B, at step 416. Step 416 generates a second screen display 520 on the display panel 34. The display panel 34 may provide instructions 522 for entering a reverse mode. In this example, the reverse mode may be achieved by stopping the vehicle and, placing the vehicle in first gear. Stopping the vehicle corresponds to the wheel speed sensor 46 measuring no forward or reverse velocity at the wheel 16.

In step 418, it is determined whether the speed and the transmission are in first gear. As is mentioned above, the wheel speed sensor 46 is used to determine the wheel speed and the transmission position sensor 70 generates a position signal corresponding to the gear that the transmission 24 is in. When the speed is not zero and the transmission is not in first gear, step 416 generates a screen display 520. The screen display 520 illustrated in FIG. 5B may be provided. Although, one or the other may be indicated as not being met. That is, either the speed not being zero or the transmission not being in first gear may separately be provided separate screen displays.

Figure 5C:
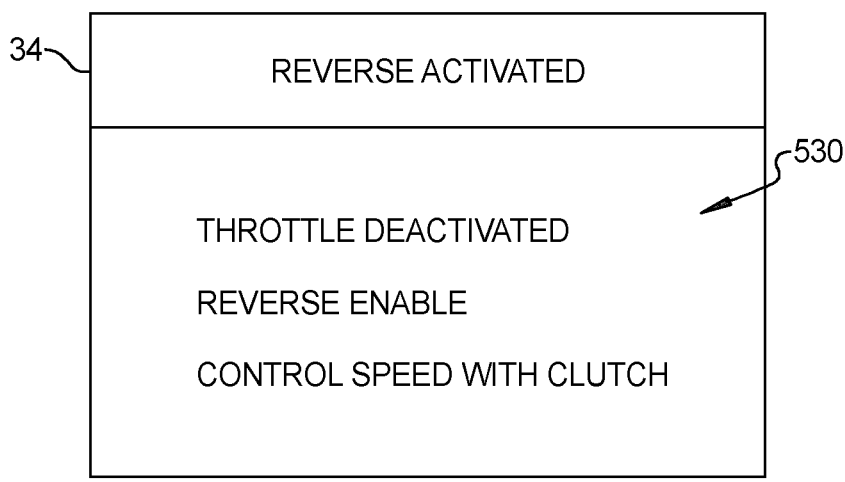
FIG. 5C is a screen display providing instructions for controlling the reverse mode with the clutch lever.

When the speed is equal to zero and the transmission is in first gear, the screen display 530 illustrated in FIG. 5C may be provided. In this example, an indicator for indicating the throttle is deactivated, the reverse being enabled and instructions to control the speed with the clutch lever 50 may be provided. In step 422 the throttle is disabled after step 418. That is, the throttle lever 52 no longer is used to activate the engine 22 to drive the transmission 24. The vehicle control module 60 thus disables the throttle in step 422. The throttle signals from the throttle may be ignored by the vehicle control module 60.

In step 424 the intermediate gear is displaced from engagement of both the fixed gear 76 and the ring gear 80. That is, the planetary gears 94 push the intermediate gear 88 out of engagement in an axial direction.

In step 426 the clutch lever 50 is used to increase or decrease the reverse speed. The clutch lever 50 may generate a signal corresponding to an amount of opening or closing of the clutch lever 50. The vehicle control module 60 receives the clutch lever signal from the clutch 50 and controls the output of the engine 22 which in turn turns the transmission output shaft 74 of the transmission 24. The drive sprocket assembly 28 consequently operates in the reverse direction.

Figure 6:
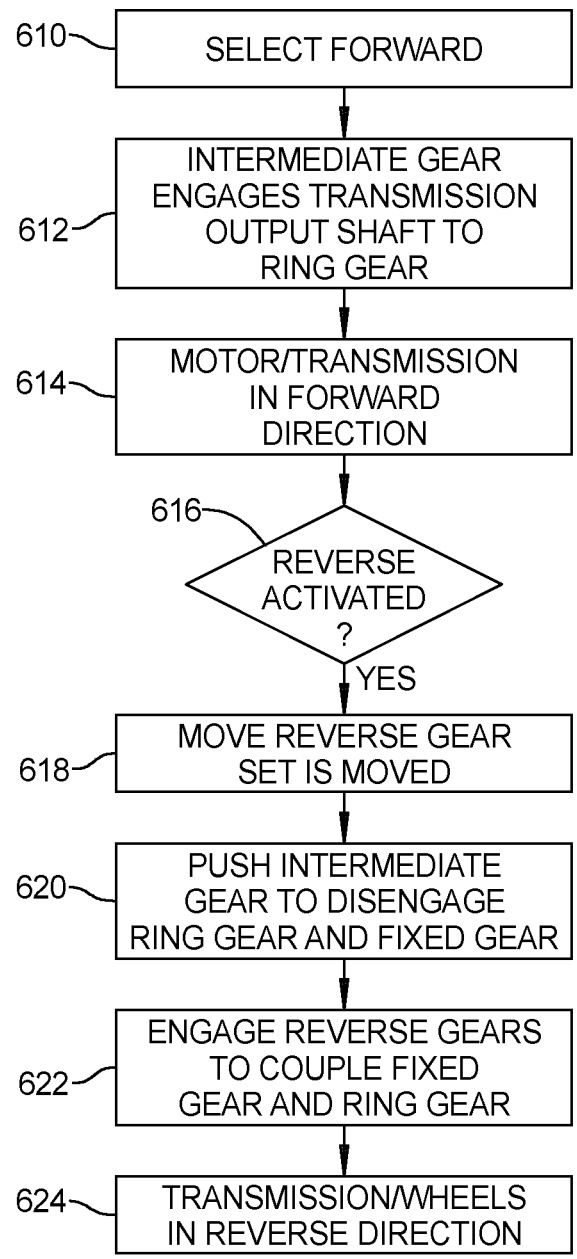
FIG. 6 is a flowchart of a method for activating the gear set within the drive sprocket assembly for engaging forward and reverse modes.

Referring now to FIG. 6, a method for operating the drive sprocket assembly 28 is set forth. In step 610 the forward direction is selected as described above in FIG. 4. In step 612 the intermediate gear engages the transmission output shaft to the ring gear. The motor and transmission and the transmission output shaft 74 accordingly travel in a forward direction in step 614. In step 616 it is determined whether reverse has been deactivated. If reverse has been deactivated the reverse gears are moved in an axial direction in step 618. In step 620 the intermediate gear is pushed to disengage the ring gear from the fixed gear. In step 622 the reverse gears couple the fixed gear and the ring gear. In step 624 when the transmission output shaft 74 rotates, the wheel 16 and the ring gear turn in an opposite direction from the rotational direction of the transmission output shaft 74.

In operation, a motorcycle or other type of vehicle may use the present system. The drive sprocket assembly 28 described above may be used to replace a conventional chain drive sprocket. The vehicle control module may be easily reprogrammed to control the reverse gear and disengage the forward direction as described above. The sprocket cover 30 may be replaced due to the greater depth of the drive sprocket assembly 28 as compared to the typical drive sprocket.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A method of activating reverse for a vehicle comprising:
   generating a reverse signal at a user interface;
   communicating the reverse signal to a control module;
   determining a vehicle speed;
   determining a transmission gear position;
   generating a clutch lever signal corresponding to an amount of opening and closing of a clutch lever;
   in response to the vehicle speed and the transmission gear position, engaging a reverse gear at a drive sprocket assembly; and
   changing a speed of the drive sprocket assembly in response to the clutch lever signal based on the amount of opening or closing of the clutch lever.

2. The method of claim 1 wherein generating the reverse signal comprises generating the reverse signal in response to a push button user interface.

3. The method of claim 1 wherein generating the reverse signal comprises generating the reverse signal in response to a touch screen user interface.

4. The method of claim 1 wherein determining the transmission gear position comprises determining the transmission gear position corresponding to a first gear.

5. The method of claim 1 wherein engaging the reverse gear comprises moving an intermediate gear between a first position engaging an inner diameter of a ring gear and an outer diameter of a fixed gear, and a second position wherein the intermediate gear is not engaging the inner diameter of the ring gear and the outer diameter of the fixed gear.

6. The method of claim 5 wherein moving the intermediate gear comprises moving the reverse gear to move the intermediate gear.

7. The method of claim 1 wherein engaging the reverse gear comprises axially moving teeth of a ring gear into engagement with a planet carrier.

8. The method of claim 7 wherein axially moving teeth of the ring gear comprises axially moving the planet carrier with a reverse fork.

9. The method of claim 1 further comprising disengaging a throttle lever from operating the vehicle while the reverse gear is engaged.

10. The method of claim 1 wherein determining a vehicle speed comprises determining the vehicle speed is zero.

11. A system comprising:
    a drive sprocket assembly;
    a clutch lever generating a clutch lever signal corresponding to an amount of opening and closing of the clutch lever;
    a user interface generating a reverse signal;
    a wheel speed sensor generating a wheel speed signal;
    a transmission position sensor generating a transmission position signal; and
    a vehicle control module of a vehicle receiving the reverse signal, the wheel speed signal and the transmission position signal, the vehicle control module engaging a reverse gear at a drive sprocket in response to the reverse signal, the wheel speed signal and the transmission position signal and changing a speed of the drive sprocket assembly in response to the clutch lever signal based on the amount of opening or closing of the clutch lever.

12. The system of claim 11 wherein the drive sprocket assembly comprises an intermediate gear movable between a first position engaging an inner diameter of a ring gear and an outer diameter of a fixed gear to a second position wherein the intermediate gear is not engaging the inner diameter of the ring gear and the outer diameter of the fixed gear.

13. The system of claim 11 wherein the drive sprocket assembly comprises a planet carrier moving into engagement with a first cover or into engagement with laterally extending teeth of a ring gear.

14. The system of claim 11 wherein the vehicle control module disengages a throttle lever from operating the vehicle while the reverse gear is engaged.

15. The system of claim 11 wherein the wheel speed signal corresponds to zero and the transmission position signal corresponds to a first gear.

16. A drive sprocket assembly for a vehicle comprising:
    a first cover comprising an axial end surface relative to a transmission output shaft;

a fixed gear fixed to the transmission output shaft, said fixed gear comprising a first outer diameter and a first inner diameter receiving the transmission output shaft;

an intermediate gear comprising a plurality of axially extending first teeth;

a planet carrier comprising a plurality of planetary gears a first plurality of recesses and a second plurality of axially extending teeth;

in a first direction of operation, the first teeth of the intermediate gear engaging the first plurality of recesses on the planet carrier; and in a second direction of operation, the second plurality of axially extending teeth of the planet carrier engage a second plurality of recesses in the axial end surface of the first cover.

17. The drive sprocket assembly as recited in claim 16 further comprising an actuator moving the planet carrier in an axial direction.

18. The drive sprocket assembly as recited in claim 17 wherein the actuator is hydraulic or electrical.

19. The drive sprocket assembly as recited in claim 18 wherein a reverse fork is operably coupled to the actuator and movers the planet carrier in the axial direction.

20. The drive sprocket assembly as recited in claim 19 wherein the second plurality of axially extending teeth extend from an axial end of the planet carrier and the first plurality of recesses are disposed on a radial edge of the planet carrier.

\* \* \* \* \*